RE 25 300
July 11, 1961     H. LA TOUR ET AL     2,992,318
FLOATING TUBE WELDING APPARATUS
Filed May 5, 1959     3 Sheets—Sheet 1
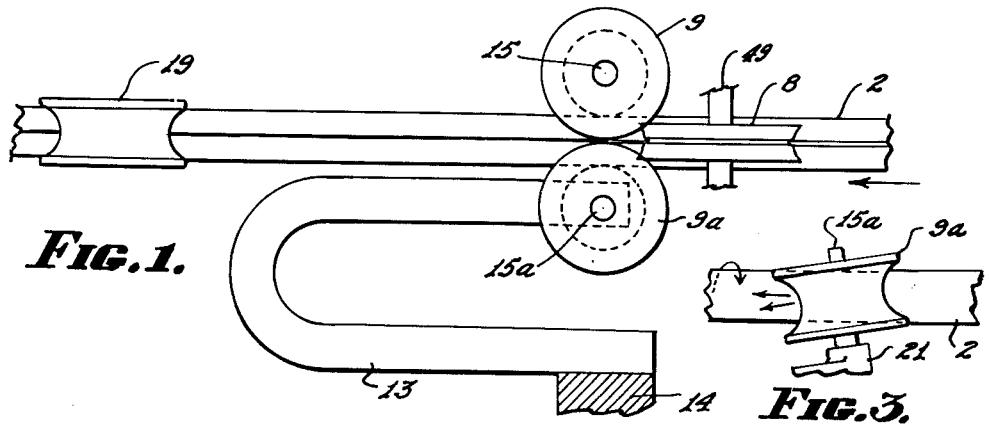
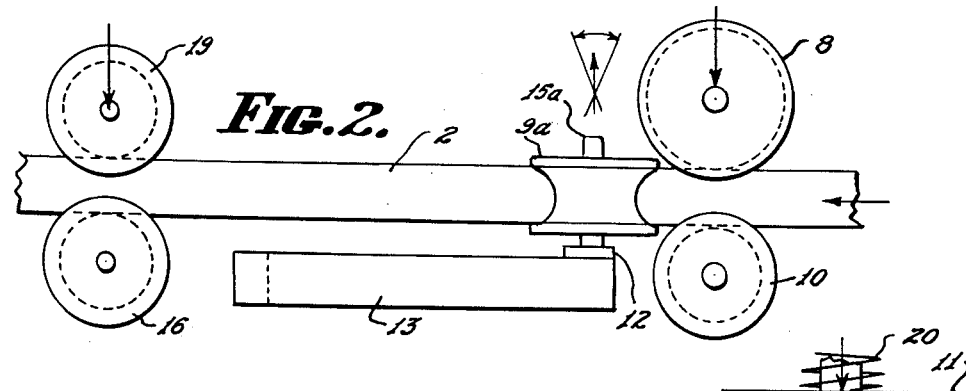
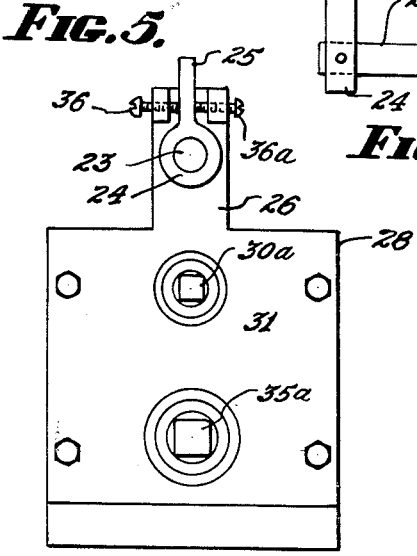
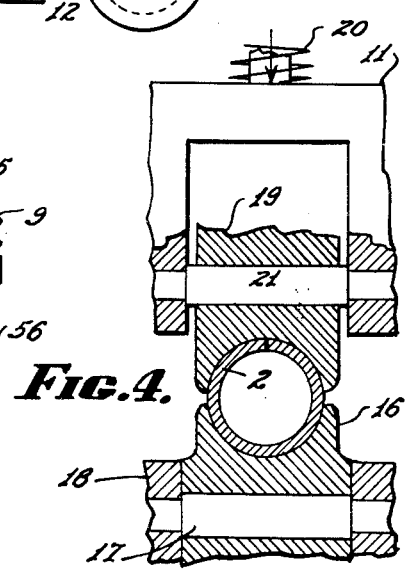
INVENTOR.
HARRY LA TOUR
AND GEORGE DANIEL MILLER
BY
*Allen & Allen*
ATTORNEYS.

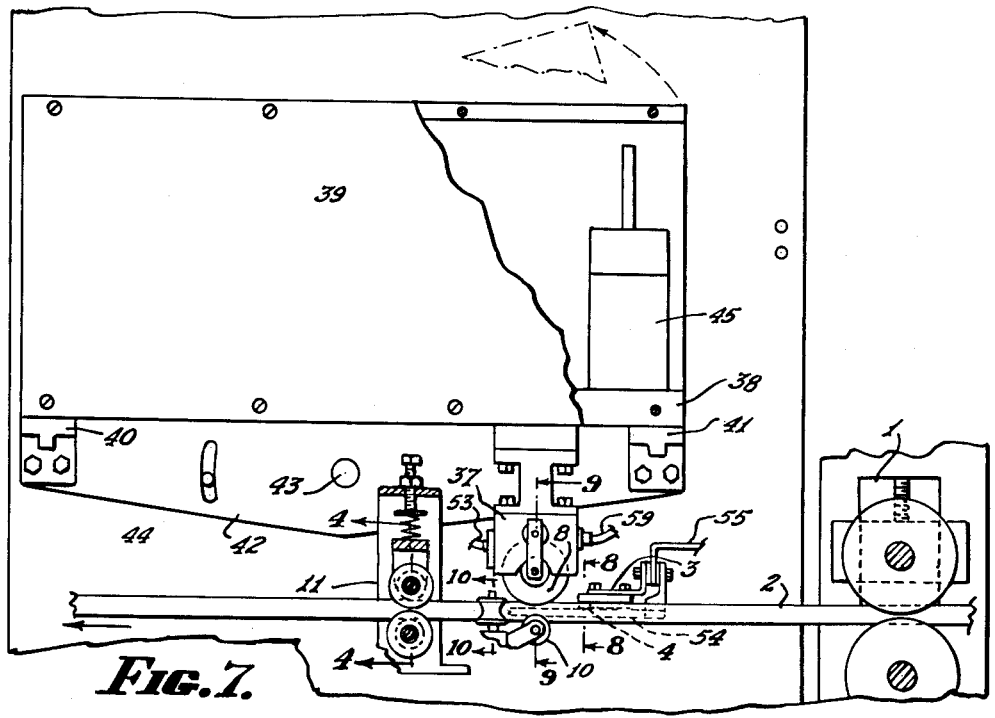
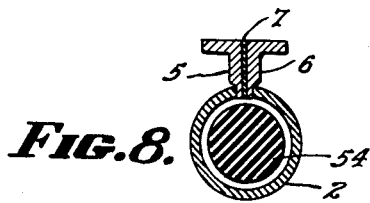
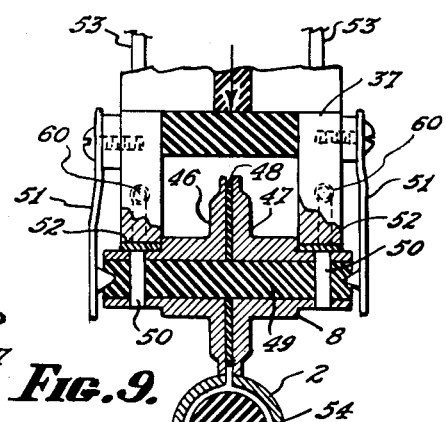
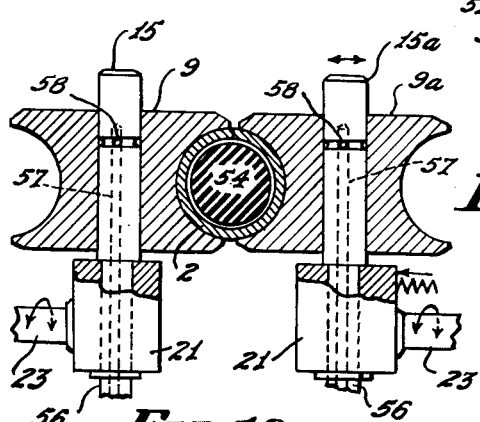

July 11, 1961  H. LA TOUR ET AL  2,992,318
FLOATING TUBE WELDING APPARATUS

Filed May 5, 1959  3 Sheets-Sheet 3

INVENTORS.
HARRY LA TOUR
AND GEORGE DANIEL MILLER.
BY
Allen & Allen
ATTORNEYS.

United States Patent Office 2,992,318
Patented July 11, 1961

2,992,318
FLOATING TUBE WELDING APPARATUS
Harry La Tour and George Daniel Miller, Middletown, Ohio, assignors to Armco Steel Corporation, Middletown, Ohio, a corporation of Ohio
Filed May 5, 1959, Ser. No. 811,029
12 Claims. (Cl. 219—59)

This invention relates to apparatus for welding together metallic sheets or strips such, for example, as the opposed edges of a longitudinal seam in metal tubing.

In the usual tubing mill, an initially flat strip of the metal is continuously advanced and shaped into a tube having a gap or seam extending lengthwise therealong, the tube so formed then being subjected to heat and pressure to close the gap and weld together the opposed seam edges. The welding is usually accomplished by the electrical resistance heating of the seam edges of the tube to plastic condition by means of contacts which press against the metal of the tube on either side of the seam, the heated edges being firmly pressed together to effect the weld. Such welding may employ low frequency current or it may comprise high frequency induction welding or high frequency resistance welding, all of which are well known techniques and need not be discussed in detail for the purposes of the instant invention, save to point out that apparatus of the instant invention may be utilized in conjunction with any of them.

In the manufacture of welded tubing the edges of the seam are not uniformly straight, but rather are somewhat irregular due to initial variations in strip width, reduction during forming, and the like, and these irregularities act to produce variations in the pressure applied to the tube at the weld point, which in turn produces variations in the welding temperature. In conventional processing such irregularities are swamped out by the application of sufficient squeeze pressure at the point of weld to produce a large amount of upset or "flash" on the tube surface, the squeeze pressure being exerted by a coacting pair of squeeze rolls mounted one on each side of the tube at substantially the point of weld. If the weld is to be scarfed smooth, the pressure exerted by the squeeze rolls must be such that the wire-like scarf is sufficiently strong so that it may be readily handled by the operator. On the other hand, if the flash is to be leveled by rolling while still hot enough to be plastic, the squeeze pressure still must be large enough to overcome the variations in strip width, with the result that the seam necessarily has a relatively large flash which must be leveled. Since in the conventional tubing apparatus the squeeze rolls operate on an inflexible basis, i.e. the squeeze roll position is fixed, the rolls being pre-set and spaced apart by a distance calculated to produce the required squeeze pressure, the resultant seam is of necessity a compromise between all the flash on the outside to all the flash on the inside. That is, with the squeeze rolls fixed, the variations in strip width will result in relatively light rolling in areas where the strip width decreases to relatively heavy rolling in areas where the strip width increases. Light rolling results in the formation of flash on the outside of the tube, whereas heavy rolling results in the formation of flash on the inside of the tube. While in relatively large diameter tubing an internal mandrel or roll set may be employed to eliminate inside flash, such devices cannot be employed in small diameter tubing.

In accordance with the instant invention it is proposed to accommodate the squeeze rolls to the tubing in such fashion as to maintain constant, or substantially constant, squeeze roll pressure irrespective of variations in the edges of the strip, thereby effecting a material reduction in flash, eliminating the need for an internal mandrel or roll set irrespective of tube diameter, and enabling the operator to maintain a substantially uniform welding temperature and control the flash so that when flash is formed will be on the outside of the tube where it can be readily leveled.

A further object of the invention is the provision of a squeeze roll construction which, in addition to maintaining virtually constant load on the seam edges regardless of irregularities in the edges of the strip, additionally assures that the seam or weld will be properly aligned between the squeeze rolls.

Still a further object of the invention is the provision of welding apparatus of the character described wherein the welding instrumentality, which is preferably an electrode wheel, is yieldingly mounted and weighted so as to obtain positive and uniform contact with the tube surface irrespective of surface variations in the tubing and wear on the tube contacting surfaces of the wheel, the improved squeeze roll mechanism and electrode wheel coacting to produce consistently high quality tubing having a minimum of flash.

The foregoing together with other objects of the invention which will appear hereinafter or which will be apparent to the skilled worker in the art upon reading these specifications, are accomplished by those constructions and arrangements of parts of which certain exemplary embodiments will be described, reference being had to the accompanying drawings wherein:

FIGURE 1 is a diagrammatic plan view of apparatus in accordance with the instant invention.

FIGURE 2 is a diagrammatic side elevational view similar to FIGURE 1.

FIGURE 3 is a fragmentary diagrammatic view illustrating the manner in which the axes of the squeeze rolls may be tilted in a vertical plane.

FIGURE 4 is an enlarged fragmentary sectional view taken along the line 4—4 of FIGURE 7.

FIGURE 5 is an end elevational view of the squeeze roll box in which the squeeze rolls are mounted.

FIGURE 6 is a side elevational view of a squeeze roll mounting arm by means of which it is adjustably mounted to the box.

FIGURE 7 is a side elevational view with parts broken away showing the general organization of the welding apparatus.

FIGURE 8 is a vertical sectional view taken along the line 8—8 of FIGURE 7 illustrating the nib holder for aligning the seam.

FIGURE 9 is a vertical sectional view taken along the line 9—9 of FIGURE 7 illustrating the electrode wheel and also showing an impeder or core contained within the tube being formed.

FIGURE 10 is an enlarged sectional view taken along the line 10—10 of FIGURE 7.

Figure 12:
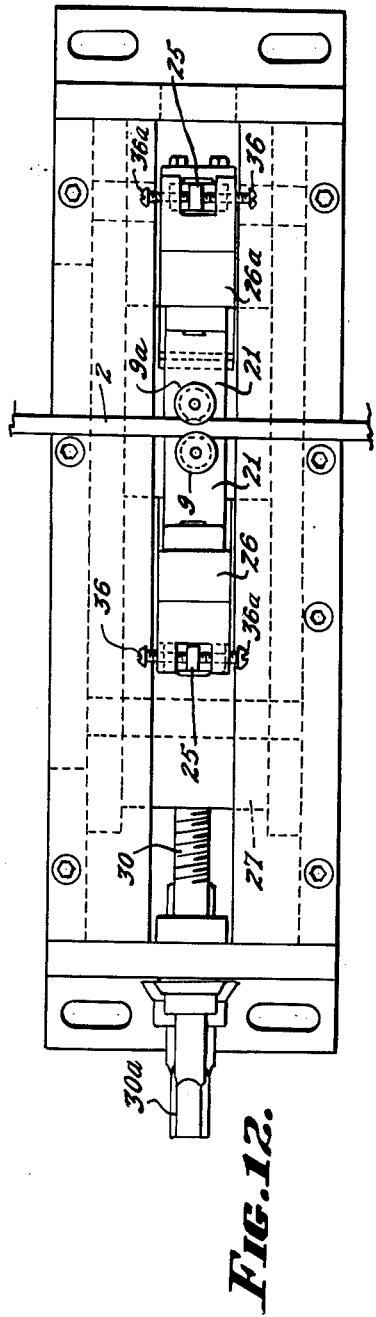
FIGURE 12 is a plan view of the squeeze roll box illustrated in FIGURE 11.

Referring first to FIGURE 7 of the drawings which illustrates the general organization of the tubing apparatus, it will be understood that the tube to be welded is first formed in a forming mill which comprises a plurality of roll stands which act to successively form an initially flat strip of metal into essentially tubular cross-section with the gap or seam uppermost. The trailing forming stand of the forming mill is shown at 1, and it will be understood that the forming mill may be of conventional character and does not form a part of the instant invention. Upon passing beyond the forming stand 1, the formed tube 2 is fed beneath a stationary seam guide 3 having a nib 4 comprising two small carbide pieces 5 and 6 (as seen in FIGURE 8) which are insulated from each other by insulating material 7, the nib so formed projecting into the open seam so as to stabilize the seam against weaving motion. The tube next passes under the electrode wheel 8 which rides on the seam just ahead of the squeeze rolls 9 and 9a, the electrode wheel serving to heat the seam edges to welding temperature. In so doing, it applies a vertical load on the tube. This load is taken on the support roll 10 which is mounted directly beneath the contact point of the electrode wheel with the tubing. It should be understood from the outset that while an electrode wheel is employed in the illustrated embodiment of the invention, it is also contemplated that such wheel may be replaced by a high frequency conductor comprising a pair of contacts which slide along the opposite sides of the tube just prior to the point where the edges of the tube are brought together. In either event, the squeeze rolls 9 and 9a will serve to press together the heated edges of the tubing to effect the weld. Following welding, the tube will pass through an ironing stand 11 which acts to roll the welded seam.

With the general organization now in mind, reference is made to FIGURES 1 and 2 of the drawings which serve to illustrate the operation of the squeeze rolls. As seen therein, the squeeze roll 9 is fixed in a pre-set position, whereas the roll 9a is mounted on a block 12 which is welded to one side of a hairpin spring 13. The other side of the hairpin spring 13 is welded to a block 14 which is adjustably mounted for movement toward and away from the tube being welded. Movement of this block toward the tubing acts to compress the spring which in turn applies load on the tube.

The squeeze rolls 9, 9a are mounted on vertically disposed shafts 15, 15a and are free for limited axial movement up or down on their shafts. This arrangement, i.e. axial floating movement, permits the rolls to automatically assume the proper vertical position relative to the tube irrespective of the degree to which the spring is compressed. That is, if the squeeze rolls were in fixed vertical positions, it would be necessary to make the spring 13 or its equivalent in such a way that the squeeze roll shafts not only do not tilt as the spring is compressed, but at the same time maintain an exact vertical position.

In addition to the foregoing, the shafts 15, 15a are also mounted so that the axis of each may be tilted with respect to the other in a vertical plane parallel to the tube axis, as in the manner illustrated in FIGURES 3 and 10, thereby permitting adjustment of the alignment of the seam between the squeeze rolls. Thus any twist previously introduced into the tube may be compensated for by inclining the squeeze roll shafts relative to each other, thereby introducing a slight compensating twist into the tubing.

As best seen in FIGURE 4, the ironing stand 11, which receives the tubing subsequent to welding, has a bottom roll 16 which is fixed in both horizontal and vertical planes, being mounted on shaft 17 held in bracket 18, whereas the top roll 19 is spring loaded, as at 20, and is free to move axially on its shaft 21 in order to facilitate alignment of the tube. It may be observed that it is not absolutely necessary to spring load top roll 19. Instead, it may be screw loaded; and both spring loaded and screw loaded ironing rolls have been employed with success.

To summarize the action which occurs, the vertical position of the tube 2 is determined by the position of the support roll 10 and the bottom roll 16 of the ironing stand; and the horizontal position of the tube by the fixed squeeze roll 9 and the bottom roll 16 of the ironing stand. The support roll 10 and the upper ironing roll 19 are free to move laterally, i.e. in horizontal planes, principally for ease in alignment, and the squeeze rolls 9, 9a are free to move axially, i.e. vertically, on their shafts so that the vertical position of the blocks on which the squeeze roll shafts are mounted need not be precisely maintained.

While preferably squeeze roll 9 will be pre-set to maintain the alignment of the tube, it too may be spring loaded, providing that the two squeeze roll springs be so matched in spring constant that the tube will maintain its normal position under the electrode wheel.

Figure 11:
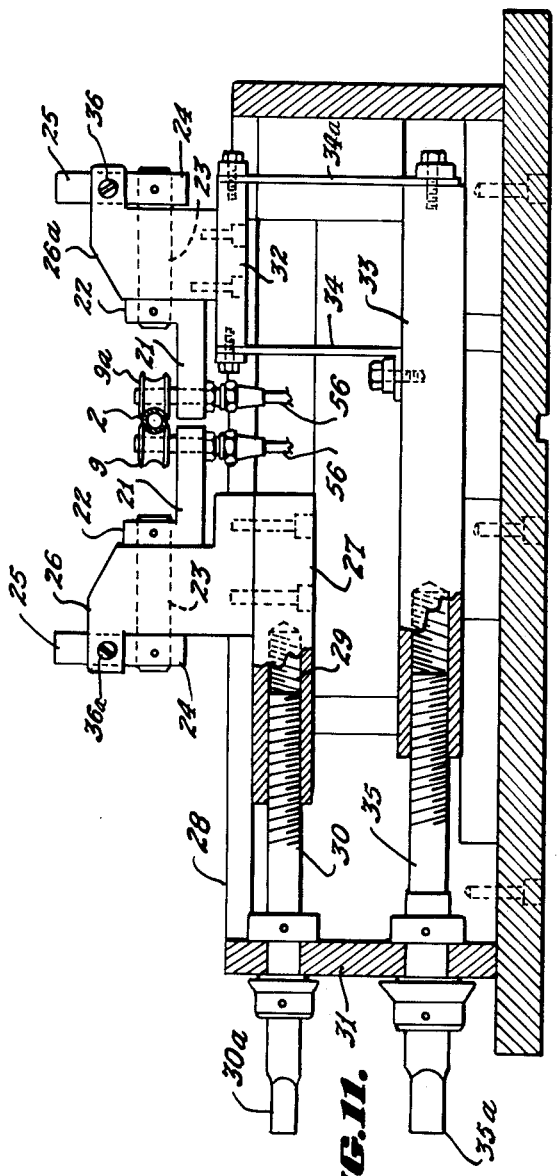
FIGURE 11 is a side elevational view with parts broken away of the squeeze roll box.

It should be pointed out that the use of the hairpin spring diagrammatically illustrated in FIGURES 1 and 2 is but one of several ways in which the desired squeeze roll pressure can be obtained. It will be apparent that other types of springs may be employed, as well as numerous types of load-actuated positioning servo-mechanisms. In an embodiment of the invention now in use, the hairpin spring was replaced by two plate-fulcrum type springs which are mounted in the squeeze roll box, such arrangement being illustrated in FIGURES 11 and 12 of the drawings. As seen therein, the squeeze roll shafts 15 and 15a are each mounted on an arm 21 terminating at its outer end in a collar 22 which receives one end of a rocker shaft 23 to the opposite end of which is fitted a collar 24 having an upwardly projecting tongue 25. One of the assemblies just described is shown in FIGURE 6 of the drawings. Each of these assemblies is received in a mounting block, the assembly mounting squeeze roll 9 being received in the block 26 and the assembly mounting roll 9a in the block 26a. Block 26 is secured to an adjustment member 27 slidable relative to the squeeze roll box 28, the member 27 having an axially extending threaded bore 29 into which a threaded shaft 30 is fitted, the shaft 30 terminating externally of the end plate 31 of the box in a head 30a to which a crank or hand wheel may be conveniently secured. With this arrangement, the block 26 may be readily moved toward and away from the tube, so as to thereby adjust the horizontal or lateral position of squeeze roll 9.

The block 26a, which mounts squeeze roll 9a, is secured to a floating base 32 suspended above adjustment member 33 by means of a pair of spring plates 34, 34a, which are preferably formed from Phosphor bronze. The spring plates serve to yieldingly mount the squeeze roll 9a so that its pressure against the tube may be automatically maintained. Adjustment of the spring pressure is obtained by means of the sliding member 33 which is under the control of threaded shaft 35 having a head 35a, which will be moved in the same manner as shaft 30.

As best seen in FIGURE 5, the tilting of the squeeze roll shafts 15, 15a may be readily accomplished by the opposed set screws 36, 36a which engage opposite sides of the tongues 25, thereby rocking the shafts 23 which in turn tilt the arms 21 and the squeeze roll shafts mounted thereon.

Referring again to FIGURE 7, the electrode wheel 8 is mounted in a holder 37 secured to the base 38 of a welding head 39 which mounts the transformer for supplying current to the electrode wheel. The base 38 is supported at its ends by arms 40 and 41 which project outwardly from a casting 42 which is pivoted at 43 to the machine frame or other support 44. This arrangement permits the entire assembly, including the electrode wheel 8, to pivot about the pivot point 43; and by providing suitable weights 45 as a part of the welding head, the necessary load may be applied to the electrode wheel to maintain good electrical contact with the tubing. As the wheel wears, the floating action of the head will automatically adjust so that a constant load is maintained on the wheel at all times.

The electrode wheel itself can be best seen in FIGURE 9 wherein it will be observed that the wheel comprises opposed parts 46 and 47 separated by an insulating barrier 48. The wheel is mounted on a non-conductive shaft 49 to which the parts 46 and 47 are secured either by pins 50 or by a press fit. The wheel so formed may be rotatably journaled in the holder 37 by means of the spring clamps 51 which permit the electrode wheel to be readily replaced simply by snapping a new wheel in place. Electrical contact is made with the parts 46 and 47 by means of the holder 37 which is a two part conductor having silver bearings 52, the opposite sides of the holder being connected by means of leads 53 to the source of electrical current housed in the head 39.

Where high frequency heating current is employed, an impeder 54 may be positioned within the tubing; and such impeder may be conveniently supported from the nib supporting bracket 55, as shown in FIGURE 7.

It is also competent to point out that a lubricant and coolant, such as soluble oil, may be employed to cool the squeeze rolls, such oil being fed to the squeeze rolls through conduits 56 (FIGURES 6 and 10). As best seen in FIGURE 10, the coolant will flow upwardly through passageways 57 in the shafts 15, 15a and will be discharged through annular grooves 58. Similarly, the coolant and lubricant may be fed to the electrode wheel through inlet 59 and passageways 60, as indicated in FIGURES 7 and 9.

The mechanism just described has been found to be highly useful in the fabrication of continuous tubing in that it is extremely easy to operate and maintain. By being able to tilt the axes of the squeeze rolls, true alignment of the seam can be maintained and necessary adjustments made even while the apparatus is in operation. The spring loading of one or both of the squeeze rolls permits the application of substantially uniform pressure against the tube at all times, thereby overcoming the normal irregularities in the seam edges of the tube and permitting uniform welding. Similarly, the floating action of the electrode wheel itself and its weight load also act to overcome variations in the surfaces of the tube at the seam. These factors contribute to the high speed production of uniform welded tubing while minimizing flash. It has been found possible with this apparatus to operate at speeds up to 300 ft. per minute employing high frequency heating current. Where low frequency (60 cycle) current is employed, the operating speed must be reduced in order to avoid a "stitching" effect.

Modifications may be made in the invention without departing from the spirit of it. Some of these modifications have already been described and others will be obvious to the skilled worker in the art upon reading these specifications. Reference should accordingly be made to the claims which follow in determining the scope of the invention.

We claim:

1. In apparatus for welding together the edges of a longitudinal seam in metal tubing wherein means are provided for longitudinally advancing the tubing for contact by a welding instrumentality positioned to contact the surface of the tubing on each side of said seam, means for subjecting the opposite sides of the tubing to pressure to bring the seam edges together in edge abutting relationship at the point of weld, said last named means comprising a pair of squeeze rolls between which the tubing passes, and spring means yieldably and adjustably mounting at least one of said squeeze rolls, said spring means constituting the sole support for the squeeze rolls so mounted and acting to maintain a substantially constant pressure on the abutting edges of the seam by instantaneously responding to variations in the seam edges.

2. In apparatus for welding together the edges of a longitudinal seam in metal tubing wherein means are provided for longitudinally advancing the tubing for contact by a welding instrumentality positioned to contact the surface of the tubing on each side of the seam, means for subjecting the opposite sides of the tubing to pressure to bring the seam edges together in edge abutting relationship at the point of weld, said last named means comprising a pair of squeeze rolls between which the tubing passes, said squeeze rolls each being mounted for rotation on a vertically disposed shaft, said squeeze rolls being free for limited axial movement along their respective shafts, at least one of said shafts and the squeeze roll thereon being yieldably and adjustably mounted relative to the tubing, whereby to maintain a substantially constant pressure on the edges of the tubing irrespective of variations in said edges.

3. In apparatus for welding together the edges of a longitudinal seam in metal tubing wherein means are provided for longitudinally advancing the tubing for contact by a welding instrumentality positioned to contact the surfaces of the tubing on each side of the seam, means for subjecting the opposite sides of the tubing to pressure to bring the seam edges together in edge abutting relationship at the point of weld, said last named means comprising a pair of squeeze rolls between which the tubing passes, said squeeze rolls having normally vertically disposed axes of rotation, means mounting said squeeze rolls for tilting movement of their axes of rotation in vertical planes parallel to the longitudinal axis of the tubing, and means mounting at least one of said squeeze rolls for yielding and adjustable movement relative to the tubing, whereby to maintain a substantially constant pressure on the edges of the tubing irrespective of variations in the edges thereof.

4. The apparatus claimed in claim 3 wherein said squeeze rolls are rotatably mounted on shafts and are free for limited axial movement along said shafts.

5. The apparatus claimed in claim 4 wherein the means for tilting the axes of rotation of said squeeze rolls comprise arms mounting said shafts, said arms being pivotally mounted on blocks movable relative to each other, whereby the distance between said squeeze rolls may be adjusted.

6. The apparatus claimed in claim 1 wherein said spring is of the hairpin type, wherein said last named squeeze roll is mounted to one end of said spring, and wherein the opposite end of said spring is mounted on a block which is adjustable relative to the tubing.

7. The apparatus claimed in claim 1 wherein said spring is of the fulcrum-type, the said last named squeeze roll being operatively connected to one end of said spring, with the other end of said spring connected to a movable support, whereby said last named squeeze roll may be moved toward and away from the other of said squeeze rolls.

8. Apparatus for welding together the edges of a longitudinal seam in metal tubing, which comprises means for longitudinally advancing the tubing, a welding means positioned to contact the surface of the tubing on each side of the seam, means mounting said welding means for yieldable contact with the tubing, and means for subjecting the opposite sides of the tubing to pressure to bring the seam edges together in edge abutting relationship, said last named means comprising a pair of squeeze rolls between which the tubing passes, said squeeze rolls lying beyond the point at which the welding means contacts the tubing, at least one of said rolls being yieldably and adjustably mounted relative to the tubing by a spring which constitutes the sole support for the roll so mounted, whereby said spring acts to maintain a substantially constant pressure on the edges of the tubing and is instantaneously responsive to variations in the edges thereof.

9. The apparatus claimed in claim 8 wherein said welding instrumentality comprises an electrode wheel, wherein the means for yieldably mounting said electrode wheel comprises a pivotally mounted welding head to which said electrode wheel is secured, and wherein a support roll underlies said electrode wheel to support the tubing at its point of contact with said electrode wheel.

10. The apparatus claimed in claim 9 wherein said squeeze rolls are rotatively mounted on vertically disposed shafts, which shafts are titltable in vertical planes paralleling the longitudinal axis of the tubing, and wherein said squeeze rolls are free for limited axial movement along their shafts.

11. The apparatus claimed in claim 10 including an ironing stand for receiving the tubing subsequent to its passage between said squeeze rolls, said ironing stand having a fixed bottom roll for supporting the tubing from beneath, and an adjustable top roll for contacting the tubing in the area of the welded seam.

12. The apparatus claimed in claim 11 wherein said top ironing roll is free for limited axial movement, and wherein said bottom ironing roll is fixed against axial movement.

References Cited in the file of this patent

UNITED STATES PATENTS

| | | |
|---|---|---|
| 1,555,034 | Stanley et al. | Sept. 29, 1925 |
| 1,700,408 | Holt | Jan. 29, 1929 |
| 2,237,551 | Darner | Apr. 8, 1941 |
| 2,240,896 | Sonnichsen | May 6, 1941 |
| 2,293,846 | Nichols | Aug. 25, 1942 |
| 2,452,303 | Honen | Oct. 26, 1948 |
| 2,492,572 | Hahn et al. | Dec. 27, 1949 |